US008657387B2

(12) United States Patent
Schlanger

(10) Patent No.: US 8,657,387 B2
(45) Date of Patent: *Feb. 25, 2014

(54) CONNECTING SYSTEM FOR TENSILE ELEMENTS

(76) Inventor: Raphael Schlanger, Wilton, CT (US)

( * ) Notice: Subject to any disclaimer, the term of this patent is extended or adjusted under 35 U.S.C. 154(b) by 278 days.

This patent is subject to a terminal disclaimer.

(21) Appl. No.: 12/806,064

(22) Filed: Aug. 5, 2010

(65) Prior Publication Data

US 2010/0301662 A1    Dec. 2, 2010

Related U.S. Application Data

(63) Continuation-in-part of application No. 11/879,333, filed on Jul. 17, 2007, now Pat. No. 7,784,878, which is a continuation-in-part of application No. 10/755,653, filed on Jan. 12, 2004, now Pat. No. 7,357,460.

(51) Int. Cl.
 *B60B 5/02*    (2006.01)
(52) U.S. Cl.
 USPC ............................. 301/104; 301/58; 301/59
(58) Field of Classification Search
 USPC ............................................. 301/58–59, 104
 See application file for complete search history.

(56) References Cited

U.S. PATENT DOCUMENTS

| | | | | | |
|---|---|---|---|---|---|
| 1,934,102 | A | * | 11/1933 | Stoler | 301/104 |
| 4,729,605 | A | * | 3/1988 | Imao et al. | 301/104 |
| 5,110,190 | A | * | 5/1992 | Johnson | 301/55 |
| 5,350,221 | A | * | 9/1994 | Pearce et al. | 301/104 |
| 6,036,281 | A | * | 3/2000 | Campbell | 301/104 |
| 7,357,460 | B2 | * | 4/2008 | Schlanger | 301/104 |
| 7,784,878 | B2 | * | 8/2010 | Schlanger | 301/104 |
| 2004/0124694 | A1 | * | 7/2004 | Tien | 301/58 |

* cited by examiner

*Primary Examiner* — Jason Bellinger

(57) ABSTRACT

An improved connecting system for a vehicle wheel spoke, including a spoke having an end portion, a span portion and a cross-section thereof, a connecting element; a bracing element such as a rim or hub, a tensile axis of applied tensile load along the span portion, and a longitudinal axis along the spoke. The connecting element is made of hardened molding material and the spoke is overmolded by the connecting element during solidification of the hardened molding material. The connecting element is joined to the spoke at an overmolded interface and the connecting element is connected to the bracing element.

50 Claims, 12 Drawing Sheets

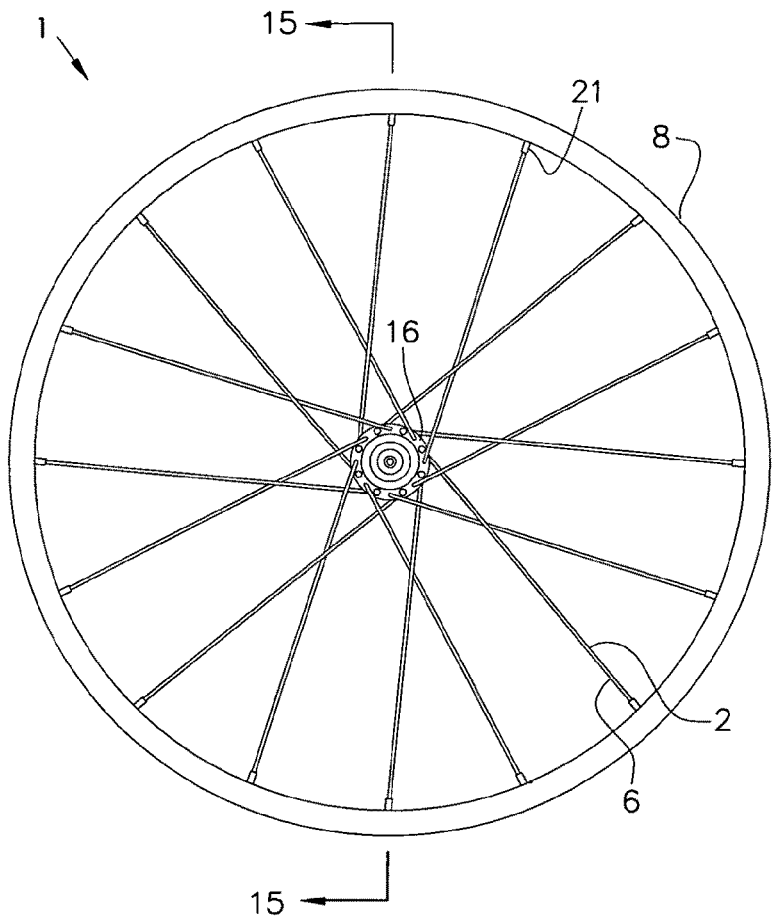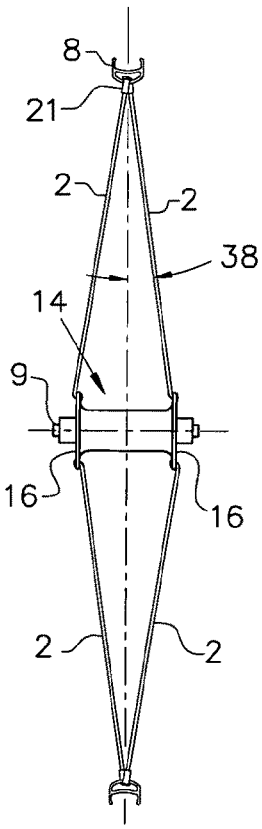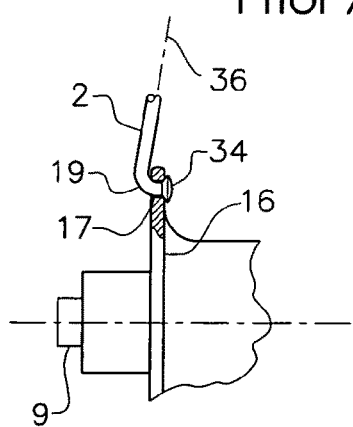
FIG. 2a
Prior Art
FIG. 2b
Prior Art
FIG. 2c
Prior Art

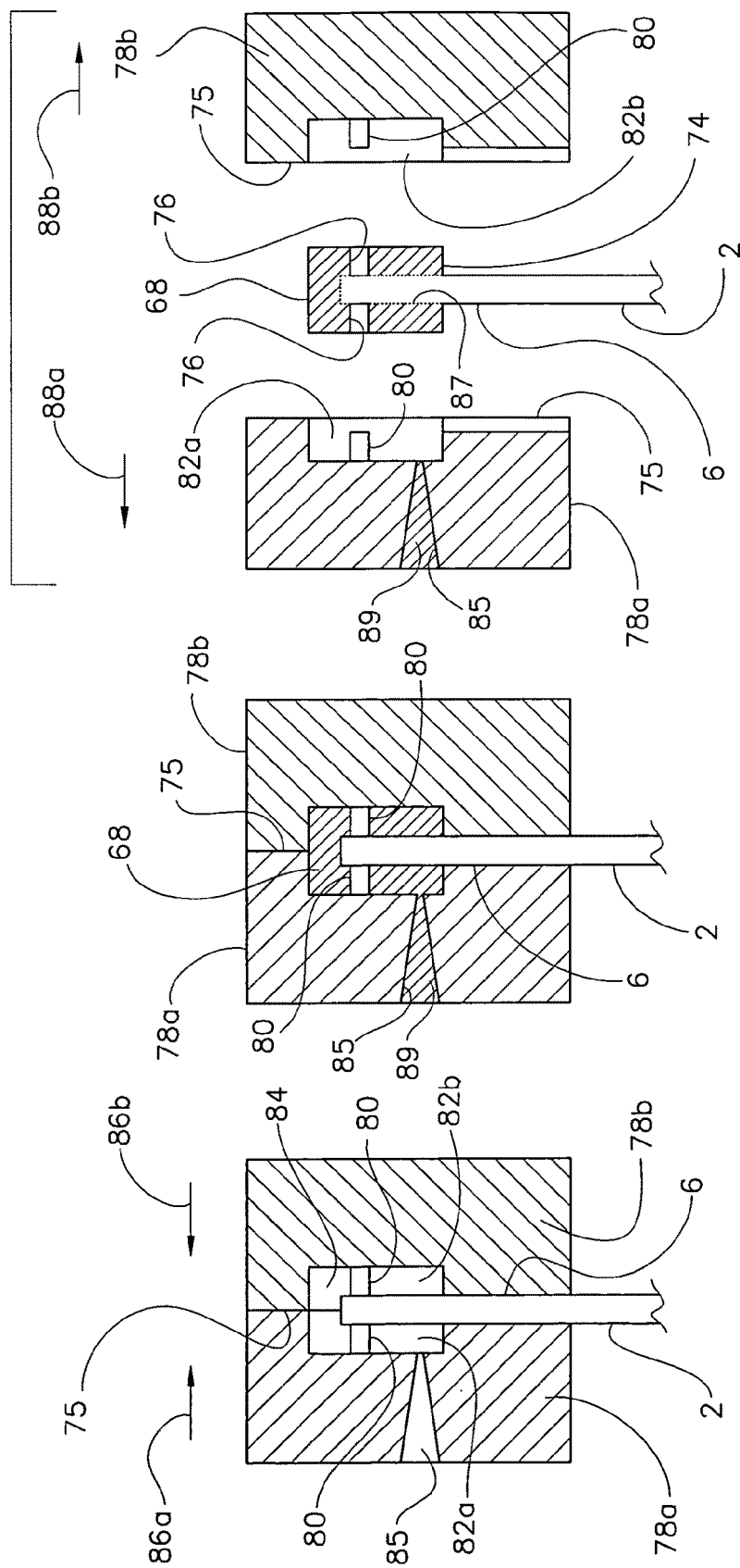

CONNECTING SYSTEM FOR TENSILE ELEMENTS

CROSS-REFERENCE TO RELATED APPLICATION

This application is a Continuation-In-Part of U.S. patent application Ser. No. 11/879,333, filed Jul. 17, 2007, and issued as U.S. Pat. No. 7,784,878, which is a Continuation-In-Part of U.S. patent application Ser. No. 10/755,653, filed Jan. 12, 2004 and issued as U.S. Pat. No. 7,357,460.

BACKGROUND OF THE INVENTION (1) Field of the Invention

The present invention relates to an improved connection system for a tensile element, particularly applicable to the spoke of a bicycle wheel.

(2) Description of the Related Art

Heretofore, the vast majority of bicycle wheels have been constructed using steel wire spokes with one headed end for connection with the bicycle hub and an opposing end that is directly threaded to accept a spoke nipple that engages the rim. By adjusting the threaded connection between the spoke and the nipple, the overall length of the spoke may be shortened or lengthened to create a balanced pretension in the spokes of the wheel.

Bicycle spokes serve as structural tensile elements where the tension of the spoke is resisted by the compression of the outer rim hoop to create a remarkably efficient wheel structure for handling the loads associated with the operation of the bicycle. The technology of conventional bicycle spokes has remained unchanged for the better part of a century.

Cyclists are continually striving to reduce the weight and increase the efficiency of their bicycle, especially rotating components such as the bicycle wheel. However, the steel spokes of conventional bicycle wheels are quite heavy and add significant weight to the wheel assembly.

In addition to their excessive weight, steel bicycle spokes have poor vibration-damping characteristics and tend to be very efficient at transmitting road vibration to the rider. By transmitting vibration, rather than absorbing it, the conventional steel-spoke bicycle wheel lacks in rider comfort and control.

In attempt to reduce weight, many makers of high-end wheels have resorted to forming their spokes from thinner gage steel wire. This causes the stress in the spoke to increase and makes the wheel more prone to spoke failure due to fatigue. The thinner steel wire has lower tensile stiffness, which can contribute to a reduced lateral stiffness of the wheel.

In the last 20 years, great strides have been made in the development of very lightweight materials that also have excellent tensile characteristics. Some of the most attractive of these materials include high-performance fibers, such as carbon fiber, aramid fiber, liquid crystal fiber, PBO fiber and the like. However, when attempting to utilize them as spokes in bicycle wheel construction, these fibrous materials are far more difficult to efficiently couple or terminate than their conventional steel-wire counterparts. This is the primary reason that the vast majority of bicycle wheels are still constructed using steel spokes.

Accordingly, it is an objective of the present invention to overcome the forgoing disadvantages and to provide a coupling or termination connection for a vehicle wheel spoke or tensile element that is strong, lightweight and inexpensive.

An efficient connector coupling or termination should have a tensile strength that approximates the tensile strength of the lightweight tensile element and should not be so heavy as to detract from the weight benefit of these lightweight materials. In addition, cost is always a concern in the bicycle industry. These lightweight materials are often more expensive than the steel wire that they replace. An overly complex or expensive connector would make such a spoke to be cost prohibitive.

It is a further objective of the present invention to provide a construction as aforesaid which reduces cost and provides a wheel that is light in weight and high in strength and reliability.

Further objects and advantages of the present invention will appear hereinbelow.

SUMMARY OF THE INVENTION

In accordance with the present invention, it has now been found that the forgoing objects and advantages may be readily obtained.

The present invention comprises a spoke having an end portion and a cross-section thereof, a connecting element, a bracing element, and a tensile axis of applied tensile load along the span of the spoke. The connecting element overmolds the spoke and is joined to the spoke by means of an overmolded interface with the connecting element. The deformable connecting element is connected to the bracing element.

Also, since the overmolded connecting element is formed in a mold, its external geometry may be closely controlled and may include a wide range of geometric features and surfaces, which may be easily optimized to provide a highly effective connection between the connector and the bracing element. Further, the ability to mold precise features into the external surface of the connector may be exploited to combine the function of multiple parts into a single molded component. Still further, during molding, the fluent molding material may closely conform to the surfaces of the spoke, including irregular surfaces, to maximize the interface surface area and to provide an optimized overmolded interface between the connector and the spoke upon subsequent solidification of the molding material.

In a preferred embodiment, the connecting element includes threads to provide a means of threaded engagement between the connecting element and the bracing element. In a further preferred embodiment, the connecting element includes an overlying surface to provide engagement between the connecting element and the bracing element.

In an advantageous embodiment, the spoke includes reinforcement fibers. In a further advantageous embodiment, the reinforcement fibers are aligned to be parallel to the tensile axis. In a further advantageous arrangement, the fibers are at least 4 mm in length or are continuous and generally extend the length of the span. In a still further advantageous embodiment, the reinforcement fibers are encapsulated in a matrix. In a yet further embodiment, the matrix is at least one of a thermoplastic and a thermoset polymer resin matrix. Such fiber-reinforced spokes may have very high tensile properties at a much lower weight than conventional steel spokes, thus providing a significant weight savings to the wheel assembly.

In an advantageous embodiment, the connecting element comprises hardened molding material with reinforcement fibers, where the hardened molding material is formed in a mold. Such fiber-reinforced connectors may have very high tensile properties at a much lower weight than conventional steel spokes, thus providing a significant weight savings to the wheel assembly.

In an additional advantageous embodiment, an auxiliary component is provided to facilitate the connection between the connecting element and the bracing element. In a further advantageous embodiment, the connecting element has an overlie engagement with the bracing element, including matched surface-to-surface contact between the connecting element and the bracing element and/or the auxiliary element. The molded external geometry also may include non-circular external geometry for rotational manipulation of the deformable connecting element.

The present invention obtains many advantages. One advantage of the present invention is the ability to utilize lightweight materials for the spoke while minimizing the cost and expense of the completed assembly.

The embodiments described herein represent a range of configurations wherein an overmolded connector is utilized to create an effective termination of a tensile element such as a bicycle spoke. The result is an improved assembly, including a means to connect the spoke with a bracing component, such as a hub or rim, to create a bicycle wheel that is exceptionally durable and light in weight.

The present invention may be readily adapted to lightweight fibrous materials including high-performance fibers, such as carbon fiber, aramid fiber (such as Kevlar®), LCP (liquid crystal fiber such as Vectran®), PBO (polyphenylenebenzobisoxasole fiber such as Zylon®), polyethylene fiber (such as Spectra®) and the like. These materials may be of the dry-fiber form or they may be impregnated within a matrix. In any case, these materials represent a significant performance improvement over the steel spokes they replace. In comparison with the steel wire commonly used in spoke construction, these fibrous materials have equivalent or greater tensile strength than the steel spoke at a much lower density. This allows for the construction of a much lighter spoke and a lighter wheel. Further, these materials have significantly better vibration-damping characteristics for greater rider comfort and control. Still further, these materials also have excellent tensile fatigue properties to reduce or even eliminate spoke failures due to fatigue.

While the present invention may be readily adapted to spokes of fiber-reinforced construction, the embodiments described herein may be readily adapted to spokes of other isotropic materials as well. The present invention provides localized reinforcement of the spoke in the region of the coupling or termination. This reinforcement may be advantageous to provide support to the spoke in applications where the spoke may otherwise, for example, be more brittle, more flexible, weaker or more notch-sensitive. Further, the present invention provides effective coupling or termination of a tensile element that would otherwise be difficult or impossible to achieve.

The coupling and termination embodiments described herein are highly effective at transmitting tensile loads to the tensile element and can be made to be as strong or stronger than the tensile element that they are connected to. Further, the molding processes to form the overmolded connector may be performed in a variety of well-known and cost-effective processes that are capable of producing parts in high volume. The embodiments described herein are relatively inexpensive to produce to effectively control the overall cost of the wheel.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 2a is an axial plan view illustrating a prior art bicycle wheel;

FIG. 2b is a cross-section view of the prior art bicycle wheel as seen generally in the direction 15-15 of FIG. 2a;

FIG. 2c is a fragmentary view detailing the view illustrated in FIG. 2b where the hub flange is shown in a partial cross-section to illustrate the connection with the spoke;

FIG. 3b is a cross-section view of the bicycle wheel of FIG. 1a as seen generally in the direction 11-11 of FIG. 1a;

FIG. 9b is a cross sectional view of the embodiment of FIG. 9a, showing the spoke as an insert in a mold, where the mold includes alignment projections to align the spoke during molding;

FIG. 9c is a cross sectional view of the embodiment of FIG. 9b, showing the overmolded connector as formed in the mold, including the spoke insert;

FIG. 9d is a cross sectional view of the embodiment of FIG. 9c, showing the overmolded connector as removed from the mold and joined to the spoke insert;

DETAILED DESCRIPTION OF THE INVENTION

Figure 1:
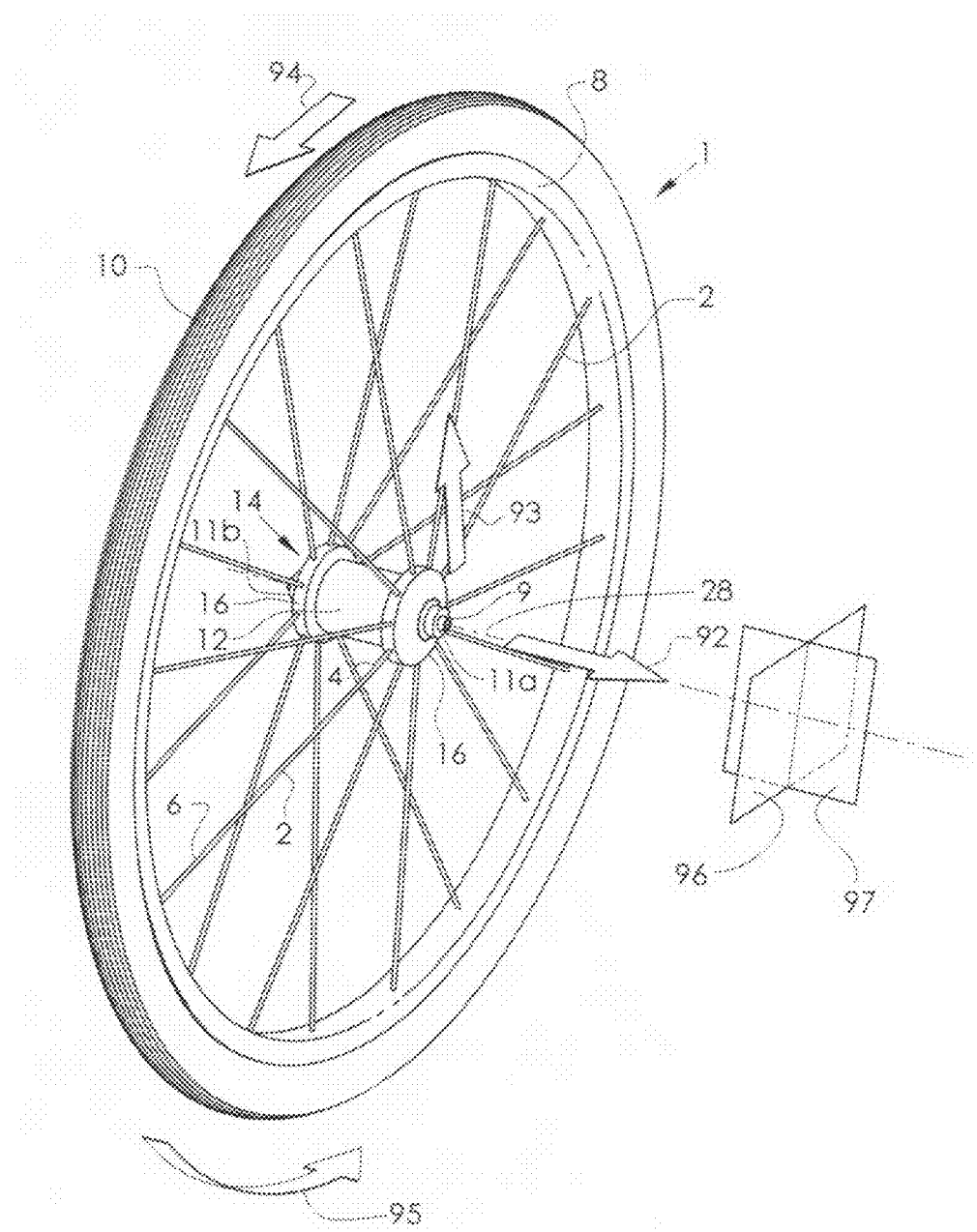
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. For clarity, the frame and the quick release skewer assembly are not shown in this figure. The hub shell 14 is rotatable about the axle 9 and includes at least two axially spaced hub flanges 16, each of which include a means for connecting with the spokes 2. Axle 9 includes end faces 11a and 11b that define the spacing of its mounting with the frame (not shown). The axial axis 28 is the axial centerline of rotation of the bicycle wheel 1. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 97 is a plane that is generally parallel to the axial axis. An orientation that is radially inboard (or inward) is nearer to the axial axis 28 of rotation and a radially outboard (or outward) is further from the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard orientation is an orientation that is radially proximal to the axial axis 28 and a radially outboard orientation is an orientation that is radially distal to the axial axis 28. An axially inwardly facing surface is a surface that faces toward the axial midpoint between the two end faces 11a and 11b. Conversely, an axially outwardly facing surface is a surface that faces away from the axial midpoint between the two end faces 11a and 11b.

While it is most common for the hub shell 14 to rotate about a fixed axle 9, there are some cases where it is desirable to permit the axle 9 to be fixed with the wheel 1 such as the case where the wheel 1 is driven by the axle 9.

For the purposes of using conventional terminology, the term "hub flange" is used herein to describe a region of the hub shell 14 to which the spokes 2 are joined. While the surface of the hub flange may be raised and flange-like in comparison to other surfaces of the hub shell 14, this is not a requirement for the present invention and the hub flange 16 may alternatively be flush or recessed relative to other hub shell surfaces.

It may be easiest to mold or otherwise form or fabricate the individual hub flanges 16 separately and then assemble these hub flanges 16, along with other components as required, such as the body portion 12, to create a complete hub shell 14. This hub shell 14 assembly may be permanent or else it may be removably assembled, allowing the hub flange 16 to be disassembled from the other portions of the hub shell 14 for servicing in the field. However, it is also anticipated that the hub shell 14, including the body portion 12 and a multiple of hub flanges 16, may be molded or formed together as a unit.

As is well known in the art, a wheel 1 may be of tension-spoke construction, where the central hub hangs in tension by the spokes from the rim portion directly above, or it may be of compression-spoke construction, where the hub is supported by compressing the spoke directly beneath it. Since the present invention may be directed toward bicycle wheels and since the tension-spoke wheel is generally a more efficient structure than compression-spoke wheel, most of the discussion herein is focused with an eye toward tension-spoke wheel construction. However, it is anticipated that most, if not all, of the embodiments of the present invention may be adapted or otherwise applied to compression-spoke wheel construction as well. For a tension-spoke wheel, it is preferable that the wheel includes at least two hub flanges that are axially spaced on either side of the rim or, more specifically, the spoke attachment points at the rim. Thus the spokes fixed to opposite hub flanges will converge as they extend to the rim as illustrated in FIG. 2b. Additionally, a tension-spoke wheel will usually be pretensioned during assembly to create a pretensioned structure of balanced spoke tension that allows the axle supporting loads to be distributed among several, if not all, of the spokes of the wheel. It is this ability to share the stresses among its spokes that helps to make the tension-spoke wheel the highly efficient structure that it is. For a compression-spoke wheel, it is often preferable to employ at least two axially spaced hub flanges, however, in the case where the spokes have sufficient bending stiffness to support the requisite lateral loads, only a single hub flange may be employed.

FIGS. 2a, 2b and 2c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16.

The wheel is assembled by first threading each individual spoke 2 through an axial hole 17 in the hub flange 16 until the j-bend 19 is hooked within the hole 17. The spoke 2 is then pivoted to extend in a generally radial direction toward the rim 8. The enlarged portion 34 or "head" of the spoke 2 prevents the spoke 2 from pulling through the hole 17 in the hub flange 16. The second end 6 of each spoke 2 is then fixed to the rim 8 via spoke nipples 21. Tightening the threaded engagement between the spoke nipple 21 and the spoke 2 serves to effectively shorten the length of the spoke 2. Thus, as the nipples 21 are threadably tightened, the spokes are drawn up tight and a degree of pre-tension is induced in the spoke 2. By selectively adjusting this threaded engagement, the spoke pre-tension may be adjusted to align the trueness of the rim 8. The spoke pre-tension is resisted by circumferential compression of the rim 8 and it is this balance of forces that imparts efficient structural integrity to the bicycle wheel 1. Also shown in FIG. 2b is bracing angle 38 between the radial centerline plane of the rim 8 and the tensile axis 36 of the spokes 2. As this bracing angle 38 is increased, the lateral stiffness (i.e. stiffness in the axial direction 92) of the wheel 1 is also increased.

Figure 3A:
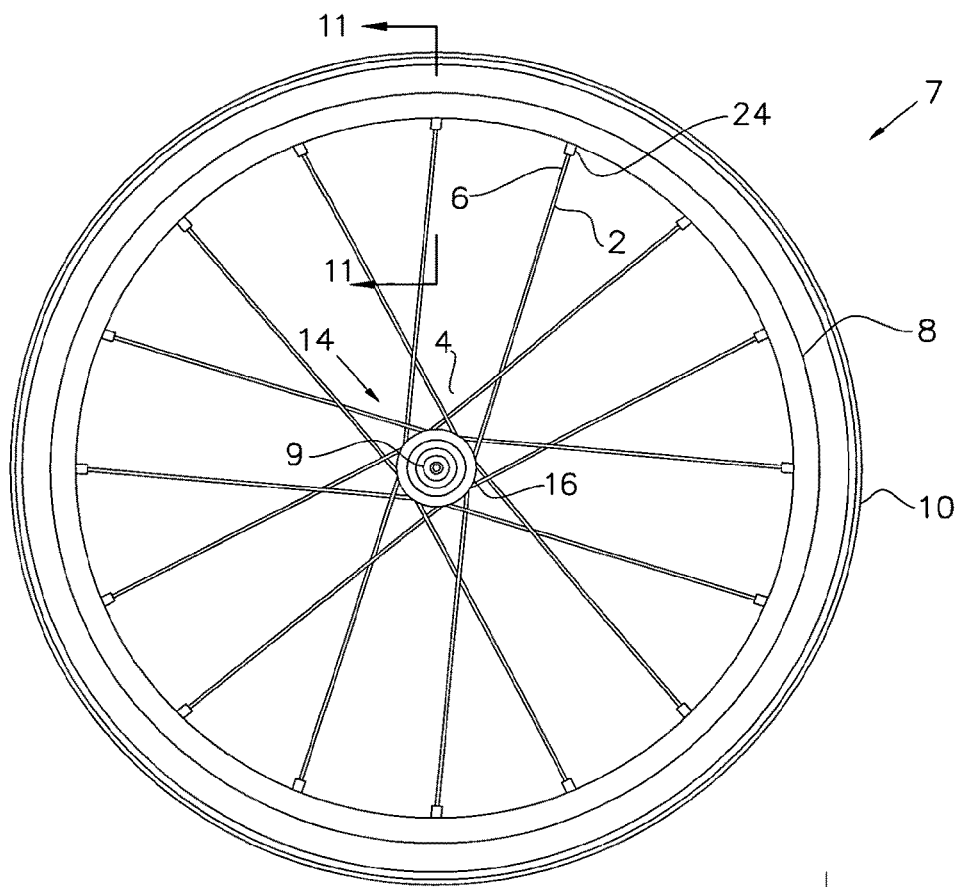
FIG. 3a is a plan view of a bicycle wheel, including connectors or connecting elements as described in the present invention.

FIG. 3a shows an exemplary bicycle wheel 7 that corresponds to the embodiments described herein. This figure is shown to provide a generic assembly to illustrate an arrangement wherein the present invention may be adapted to utilization in bicycle wheel construction. The bicycle wheel 7 includes spokes 2, hub 14, rim 8, and tire 10. The hub 14 includes hub flanges 16 and axle 9. The rim 8 includes geometry for mounting of a tire 10 and a multiplicity of spoke holes 22 in its spoke bed wall 33, each to accept an individual connector 24. It is noted that the rim 8 shown here is an exemplary representation of a bracing element that may serve as a rim or a hub flange and may take on a wide range of forms. The spokes 2 are preferably constructed of fiber-reinforced material and are connected at their first end 4 to their associated hub flange 16 and at their second end 6 to the rim 8. The spoke 2 is a long slender tensile element with a longitudinal axis 26 along its length and generally parallel to its sidewalls. The spoke 2 also has a tensile axis 36 of applied tensile load, which is generally collinear to the longitudinal axis. The spoke 2 is shown here to be exposed over the majority of its span length and is shown to be surrounded by the connector in the overmolded interface 27.

Figure 3B:
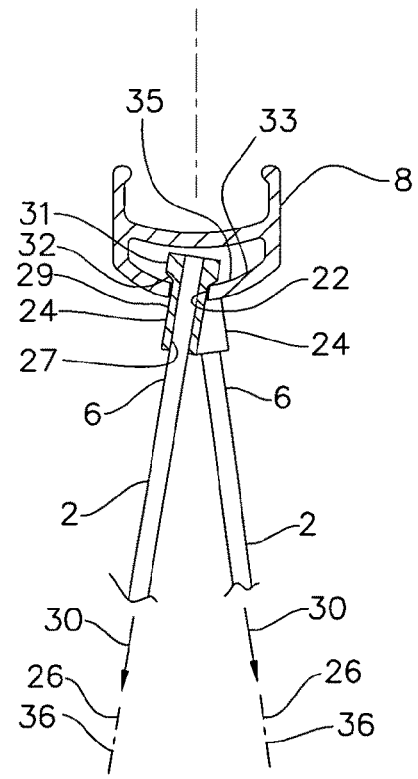

To create a solid connection between the spoke 2 and the rim 8, the second end 6 of each fiber reinforced spoke 2 is first connected to a corresponding connector 24 by means of an overmolded connection as described variously within the instant disclosure. The connector 24 is overmolded to the second end 6 of the spoke 2 by means of one of the embodiments of the present invention to create an overmolded interface 27. The connector 24 includes a shank portion 29, a head portion 31, and a transition surface 32 therebetween as shown in FIG. 3b, which is a detail view of the embodiment described in FIG. 3a and shows the rim 8 in cross-section. As shown in FIG. 3b, shank portion 29 extends through spoke hole 22, with transition surface 32 serving as an engagement surface to bear against the radially outboard surface 35 of the spoke bed wall 33 in an overlie engagement, which provides blocking engagement to resist spoke tension 30. It should be noted that, the transition surface 32 provides engagement geometry to engage the connector 24 to the bracing element (rim 8) and that the overmolded interface 27 overlaps the transition surface 32 longitudinally along the tensile axis of the spoke 2. This longitudinal overlapping may be preferable since it allows the spoke 2 to provide longitudinal reinforcement to the connector 24 in the high stress region adjacent the transition surface 32 and also allows the design to maximize the longitudinal overlap between the spoke and the connector 24, thus maximizing the corresponding surface area of the overmolded interface 27.

Note that the span of spoke 2 is aligned in the direction of spoke tension 30 and along the tensile axis 36, which extends through the longitudinal axis 26 of the spoke 2. FIG. 3a shows that several spokes 2 of the wheel 7 may be terminated at the rim 8 in this manner. The connector 24 may alternatively be connected to the first end 4 of the spoke 2 for connection to the hub 14. For simplicity in describing this embodiment, a rim 8 connection arrangement is shown herein, with the understanding that such an embodiment may be easily adapted to hub connections as well.

It is understood that FIGS. 3a-b correspond to a simplified arrangement for illustration purposes. Most, if not all of the embodiments of the present invention may be applied to this arrangement, as well as arrangements which include facility for creating and/or adjusting spoke pre-tension, as described in FIGS. 2a-c.

For general definition purposes herein, an "integral" joinder is one that is integrated at the mating joining interface between the two components or portions being joined. This integral joinder may not be easily disassembled at the service temperature without damaging at least one of the joined components or their mating joining interface surfaces. This integral joinder usually involves a mated joining interface directly between two components. This joining interface may include a welded or adhered interface or some other interface where the two mated joining surfaces are solidly stuck or joined to each other at a joining interface to create a unified structure. Preferably this joining interface is a surface interface, with a surface area, rather than a point or edge interface. The integral joinder is in contrast to a fastened joinder, where such a fastened joinder relies on a removable or semi-removable mechanical means to bind, secure or connect the two components to each other. In a fastened joinder, the two components may generally be separated without damaging joined components and/or their mating interface surfaces.

The present invention comprises a spoke, which may be considered as a longitudinal tensile element having an end portion and a cross-section thereof, a connecting element, a bracing element, and a tensile axis of applied tensile load along the longitudinal tensile element. The longitudinal tensile element is connected to the connecting element by means of an overmolded connection at an overmolded interface between the longitudinal tensile element and the connecting element. In the embodiments shown herein, the longitudinal tensile element 2 is a vehicle wheel spoke, the hub flange 16 constitutes a first bracing element and the outer rim 8 constitutes a second bracing element.

A spoke is a longitudinal tensile element and is a generally long slender element, with a length greater than its cross sectional width, and with a longitudinal axis 26 extending generally along its length. The longitudinal tensile element includes external sidewall surface(s) that extend generally along its length. As such, the longitudinal axis 26 is generally parallel to the sidewall surface. The tensile axis 36 is the axis along which tensile loads 30 are applied to the tensile element, and is commonly collinear with the longitudinal axis 26, particularly in the region of the structural span of the longitudinal tensile element. For the purposes of explanation herein, the term "longitudinal axis" is generally interchangeable with the term "tensile axis", unless otherwise noted. Some examples of a longitudinal tensile element include the spoke of a vehicle wheel, a guy wire, a control cable, or a tendon. In most of the embodiments of the present invention, the longitudinal tensile element is capable of supporting tension, otherwise known as positive tensile loading, along its length. However, the tensile element may alternatively support compression, otherwise known as negative tensile loading, along its length, where the longitudinal tensile element provides columnar support between two bracing elements. The spoke span is considered as the portion of the spoke that is under tension and extends between its anchor points and/or engagements at the bracing elements (i.e. hub and rim). A location outboard of the spoke span is a location along the tensile axis 36 that is beyond the spoke span.

The spoke has a sidewall surface(s) that are generally parallel to the longitudinal axis 26 and an end face that is generally perpendicular to the sidewall surface. With a slender spoke, the sidewall tends to have far greater available surface area than its end face. Since a joining interface of greater surface area tends to provide a more robust connection, it is often preferable to provide joining interface that extends longitudinally along the sidewall surface and preferably by a longitudinal length at least twice the cross sectional thickness of the spoke. This is in contrast to conventional spoke arrangements that focus these loads on a small point of contact, as with conventional prior art wheel assemblies.

It may be termed that a longitudinal engagement is an engagement that includes a continuous longitudinal engagement interface or an engagement that includes at least two engagement interface locations that are longitudinally spaced along the longitudinal axis of the spoke. It is generally desirable that the longitudinal length of such an engagement be greater than the cross-sectional thickness of the spoke to create an effective engagement. Obviously, increasing the length of engagement will increase the interface surface area and will therefore increase the load carrying capacity of the connection.

Since a longitudinal engagement may reduce the contact stresses at the interface where the overmolded connector and the spoke are connected, this type of engagement is particularly applicable to bracing elements and/or spokes of polymer or reinforced polymer materials. This is particularly advantageous, since these materials tend to have high strength and light weight. However, heretofore these materials have been difficult to apply to conventional spoke connection systems that are generally focused on construction based on metallic materials.

While the spokes described in the present invention may be constructed from a variety of materials, including a wide range of metallic materials and polymeric materials, a particularly advantageous aspect of the present invention is its ability to provide a termination means for a spoke of fiber reinforced polymer material.

In order to take advantage of the lightweight and high strength of the high-performance fibers mentioned hereinabove, it may be preferable to incorporate these material(s) in the spoke. These materials tend to be anisotropic and have greater strength along the direction of the fiber. Thus it may be preferable that these fibers are aligned to be parallel to the tensile axis. It is also preferable that these reinforcement fibers be encapsulated in a matrix. While short or discontinuous fibers often provide significant reinforcement to the matrix material, it is preferable that the fibers be as long as possible to provide the greatest overlap with adjacent fibers. The utilization of continuous fibers, as indicated by 106 in FIG. 4b, that extend generally along the length of the spoke provides the highest mechanical properties.

A spoke of high strength fibers in a resin matrix has numerous advantages in the present invention. Firstly, in comparison with "dry" fibers without a resin matrix, the resin matrix allows the pre-formed spoke to maintain its form in the mold without slumping or deflecting during the molding process. Further, the resin matrix adheres the adjacent fibers to each other so that, through a joinder to the external surface of the spoke, the overmolded interface has a connection with all of the fibers of the spoke, which permits the fibers to work together for optimal tensile properties. Still further, the resin matrix coats the outside of the pre-formed spoke, which creates an optimal surface for joinder with the connector at the over molded interface.

A bracing element is one that resists or braces against all or part of the load of a tensile element. In other words, in order for a tensile element to maintain its tension (or compression) and remain a generally static structure, it must have a resisting or bracing element to bear against. Thus, the tensile element is generally anchored to two bracing elements and the tensile element thereby serves to connect the two bracing elements to each other. In an example where the tensile element is generally held in tension, such as the spoke of a tension-spoke vehicle wheel, a first bracing element could be the hub flange and a second bracing element could be the outer rim hoop. Similarly, in the case where the tensile element is generally held in compression, such as the spoke of a compression-spoke vehicle wheel, the bracing element is that element which the tensile element is pushed against.

In the discussions herein, the term "coupling" identifies a connecting element that serves to provide a structural connection between the two tensile elements, thus permitting tensile loads to be transmitted from one tensile element to another. The term "termination" or "anchor" identifies a connecting element that serves to provide a means to connect the tensile element (i.e. spoke), either directly or indirectly, to a bracing element (i.e. the hub or rim), to which the tensile element is intended to be anchored.

In the embodiments described herein, a connecting element, described herein as a "connector", is joined to a spoke at an overmolded interface. The means by which the overmolded interface serves to join the spoke and connecting element is described in discussions related to the embodiment of FIGS. 4a-d, which are also applicable to the other embodiments of the present invention as described herein.

Figure 4A:
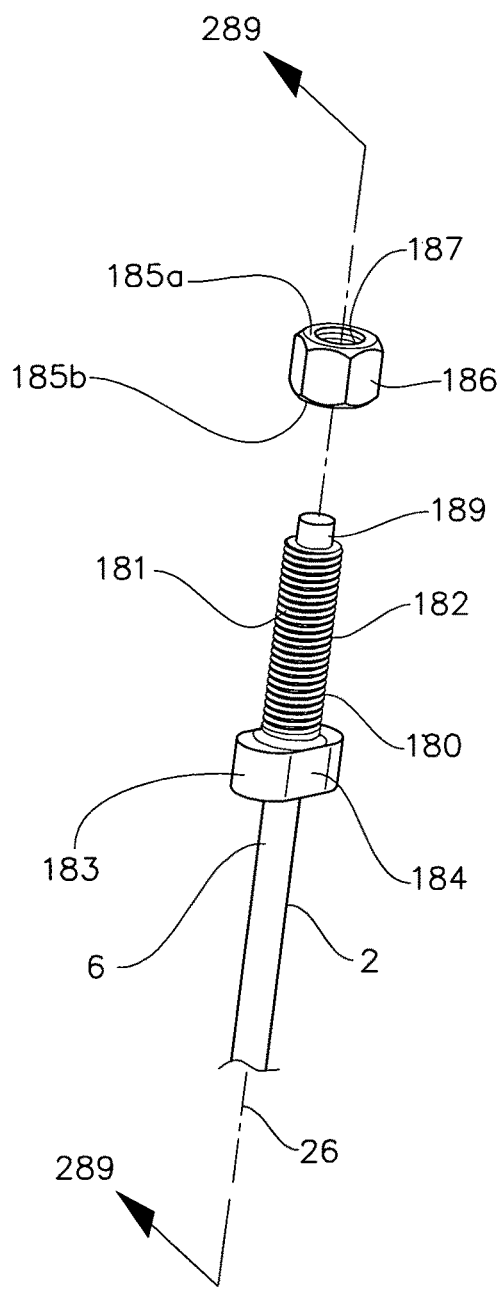
FIG. 4a is a partial perspective exploded view of a first embodiment of the present invention, showing a spoke overmolded to include a threaded connector and a mating nut.
Figure 4B:
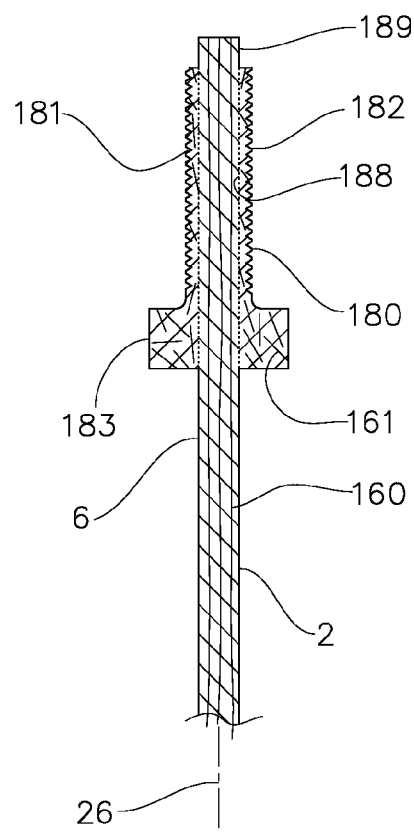
FIG. 4b is a cross sectional view, taken along the tensile axis, as seen in the direction 289-289, of the embodiment of FIG. 4a, showing the spoke as passing through the threaded connector.

FIGS. 4a-d describe an embodiment similar to the embodiment of FIGS. 3a-b, however the connector 180 includes a threaded engagement with an intermediate nut 186 to engage the bracing element. In the embodiment of FIGS. 4a-d, connector 180 includes external geometry to facilitate anchoring of the spoke 2 to a bracing element. In this case, this geometry includes the external threads 181 of threaded shank 182. As shown in FIG. 4a, connector 180 includes an externally threaded shank 182 with external threads 181 and an enlarged portion 183 at one end. The enlarged portion 183 includes noncircular wrench flats 184 that may be gripped by a wrench (not shown) to twist or to prevent twisting of the connector 180 about the tensile axis 36. Connector 180 is formed in a mold by an insert molding process where the second end 6 of the spoke 2 is a mold insert relative to the connector 180 and the connector 180 is overmolded relative to the spoke 2. The connector 180 is thus joined to spoke 2 at overmolded interface 188, as shown in FIG. 4b. Such an overmolded interface 188 may be achieved by any manner of processes, including those described herein. As also shown in FIG. 4a, hex nut 186 includes end faces 185a and 185b and internal threads 187 to threadably mate with external threads 181. Hex nut 186 may be utilized to secure the connector 180 to the bracing element.

Figure 4C:
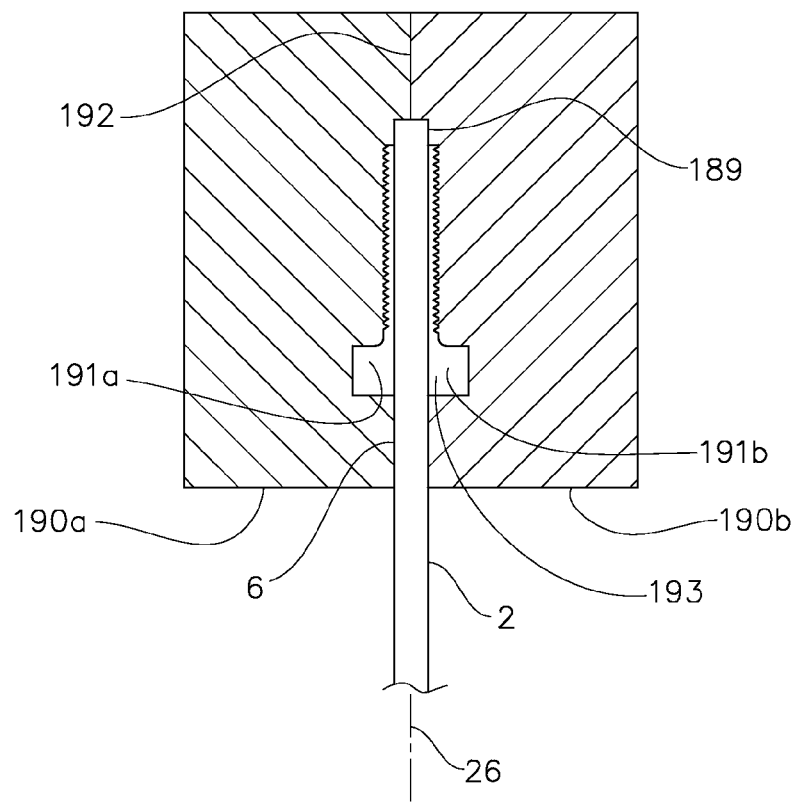
FIG. 4c is a cross sectional view, taken along the tensile axis, as seen in the direction 289-289, of the embodiment of FIG. 4a, showing the spoke as an insert in a mold.

It should be noted that, in the embodiment of FIGS. 4a-d, the second end 6 of the spoke 2 is generally straight and extends through the connector 180 along the longitudinal axis 26. Spoke 2 is exposed over much of its span length and extends through the connector 180 to include a second exposed portion 189. This permits the overmolded interface 188 to extend along the full longitudinal length of the connector to maximize the surface area of the overmolded interface 188. FIG. 4c shows how the connector of FIG. 4a may be molded in a mold comprised of mold halves 190a and 190b, each including cavity portions 191a and 191b respectively to create mold cavity 193, and a parting line 192 at the interface where mold halves 190a and 190b meet. It may be seen that the spoke 2 is a preformed element that extends through the parting line 192 as a molding insert and that the cavity portions 191a and 191b permit the overmolded connector 180 to surround the cross section of the spoke in a process commonly referred to as "insert molding". It is noted that the spoke 2 is exposed at both its second end 6 and its exposed portion 189. Thus, both the second end 6 and the exposed portion 189 may be gripped and supported within their respective regions of the parting line 192 as shown. By gripping and supporting the spoke 2 on either side of the cavity portions 191a and 191b as shown, the spoke remains rigidly locked to maintain its desired position within the cavity portions 191a and 191b and to minimize any deflection or movement of the spoke 2 during the molding process. The connector 180 may be formed by means of many molding or casting processes known in industry, including plastic injection molding. It is preferable that the connector 180 be formed from fiber reinforced thermoplastic resin, preferably with fiber at least 4 millimeters in length, as indicated by 161 in FIG. 4b. It is understood that the mold halves 190a and 190b are merely representative to illustrate a mold cavity and a parting line. Other required mold details are known in industry and may not be shown here.

In order for the second end 6 of the spoke 2 to become completely surrounded by molten molding material during casting or overmolding, the second end 6 must be suspended within the mold cavity 193. This permits the molten molding material be flowed within the cavity 193 to circumfuse and flow around the spoke 2 during molding, thus encapsulating and locking the spoke 2 upon subsequent solidification of the molding material. Upon hardening or solidification of the molding material, the external surface of the overmolded connector 180 is defined by the interior surfaces of cavity portions 191a and 191b and the overmolded connector 180 is also conformed to the surface of the spoke 2. Thus, it may be seen that the overmolded connector 180 is made of hardened molding material and the connector 180 simultaneously overmolds the spoke 2 during solidification of the hardened molding material. The spoke 2 is now joined to the connector at the overmolded interface 188. Further, the connector 180 is formed in a mold to include detailed and complex external geometry, such as external threads 181, wrench flats 184, etc., which provide means to connect the spoke to a bracing element and provide means to manipulate the spoke. Further, this "net shape" external geometry may require only minimal, if any, post-mold forming prior to its intended use.

During overmolding, the molten molding material may melt or soften the surface of the spoke 2 insert at the overmolded interface 188, thus allowing the surface of the spoke 2 to become fused and welded to the molten molding material. Upon subsequent solidification of the molding material, the spoke 2 is thus integrally joined to the overmolded connector 180 at the overmolded interface 188. For example, the spoke may have an external surface of thermoplastic polymer resin and the molten molding material may also be a thermoplastic polymer resin, such that the resin of the spoke 2 and the resin of the connector 180 become welded at the overmolded interface 188 upon solidification of the molding material.

Further, the molten or liquid molding material may become adhered or chemically coupled to the surface of the spoke 2 insert at the overmolded interface 188 during molding or casting. Upon subsequent solidification of the molding material, the spoke 2 is thus integrally joined to the overmolded connector 180 at the overmolded interface 188. For example, the molten molding material may be a thermoset resin, such as epoxy resin, which has good adhesive properties: In this case, the spoke 2 and the connector 180 become adhered at the overmolded interface 188 upon solidification of the molding material.

Still further, the molten or liquid molding material may shrink to grip the surface of the spoke 2 insert upon subsequent solidification and/or cooling of the molding material. This gripping provides a frictional connection between the spoke 2 and the connector 180. The spoke 2 is thus frictionally joined to the overmolded connector 180 at the overmolded interface 188. This gripping may also serve to augment the integral joinder between the spoke 2 and the overmolded connector 180 at the overmolded interface 188.

Figure 8A:
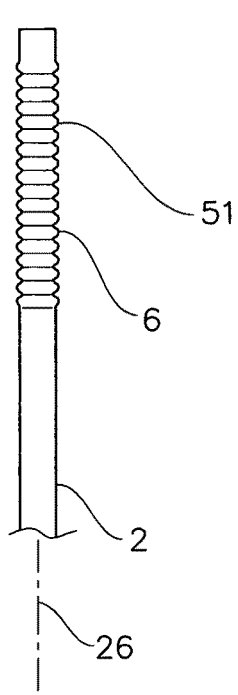
FIG. 8a is a view of a spoke of a sixth embodiment of the present invention, where the spoke includes a configured surface for interaction with an overmolded connector.
Figure 8B:
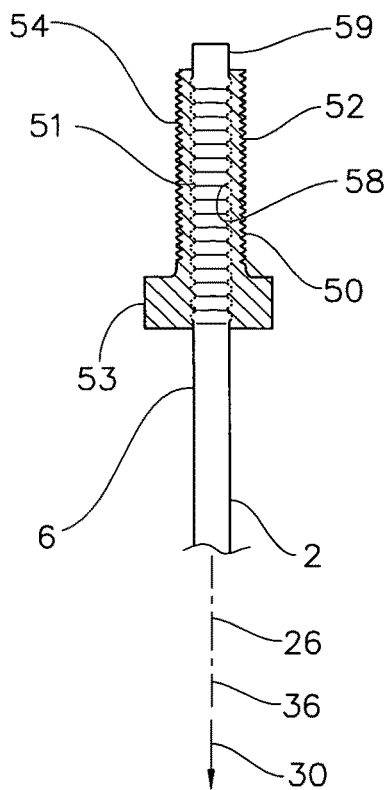
FIG. 8b is a cross sectional view of the embodiment of FIG. 8a, showing the overmolded connector as conformed and engaged to the configured surface of the spoke.

Yet further, the molten or liquid molding material may have a mechanical interlock engagement with the surface of the spoke 2 insert upon subsequent solidification and/or cooling of the molding material. The spoke 2 is thus integrally joined to the overmolded connector 180 at the overmolded interface 188. An example of such a mechanical interlock arrangement is shown in the embodiment of FIGS. 8a-b.

It is further anticipated that the surface of the spoke may have a particular coating that will serve as an intermediary layer to promote the integral joinder between the spoke and the overmolded connector 180 at or adjacent the overmolded interface 188.

In an exemplary arrangement, the spoke 2 may be made of thermoplastic polymer resin with continuous carbon fiber reinforcement that extends through the entire length of the spoke 2 and with a resin-rich external surface. The connector 180 is injection molded from thermoplastic polymer resin reinforced with 5 mm carbon fibers to include the spoke 2 as an insert in the process previously described. The thermoplastic resin of the connector 180 fuses and adheres to the thermoplastic resin of the spoke 2 at the overmolded interface 188. Further, upon post-mold cooling of the connector, the connector 180 shrinks slightly to grip the spoke 2, and further augment the joinder between the two.

In a second exemplary arrangement, the spoke 2 may be made of thermoset polymer resin, such as epoxy resin, with continuous carbon fiber reinforcement that extends through the entire length of the spoke 2 and with a resin-rich external surface. The connector 180 is cast from epoxy resin reinforced with discontinuous glass fibers to include the spoke 2 as an insert in the process previously described. The epoxy resin of the connector 180 adheres and is bonded to the thermoset resin of the spoke 2 at the overmolded interface 188. Further, upon post-mold cooling of the connector, the connector 180 shrinks slightly to grip the spoke 2, and further augment the joinder between the two.

In a third exemplary arrangement, the spoke 2 may be made stainless steel rod with a knurled surface on its second end 6. The connector 180 is die cast from aluminum to include the spoke 2 as an insert in the process previously described. The connector 180 is cast such that it conforms and interlocks to be mechanically engaged with the knurled surface of the spoke at the overmolded interface 188. Further, upon post-mold cooling of the connector, the connector 180 shrinks slightly to grip the spoke 2, further pressing the interlocking surfaces into intimate engagement.

This arrangement where an overmolded connector 180 is formed in a mold to include the spoke 2 provides many significant benefits in the function and use of the spoke, such as: the connector is both formed and joined to the spoke in one simultaneous operation, which increases cycle times and reduces labor; the connector may be economically produced with materials such as thermoplastic resin; an effective termination means for a fiber reinforced spoke is provided, which reduces the weight of the spoke assembly; and the mold cavity provides an economical means to form highly effective and detailed external geometry in the connector to create an effective connection with a bracing element. Other advantages may be recognized within the description of the present invention.

Figure 4D:
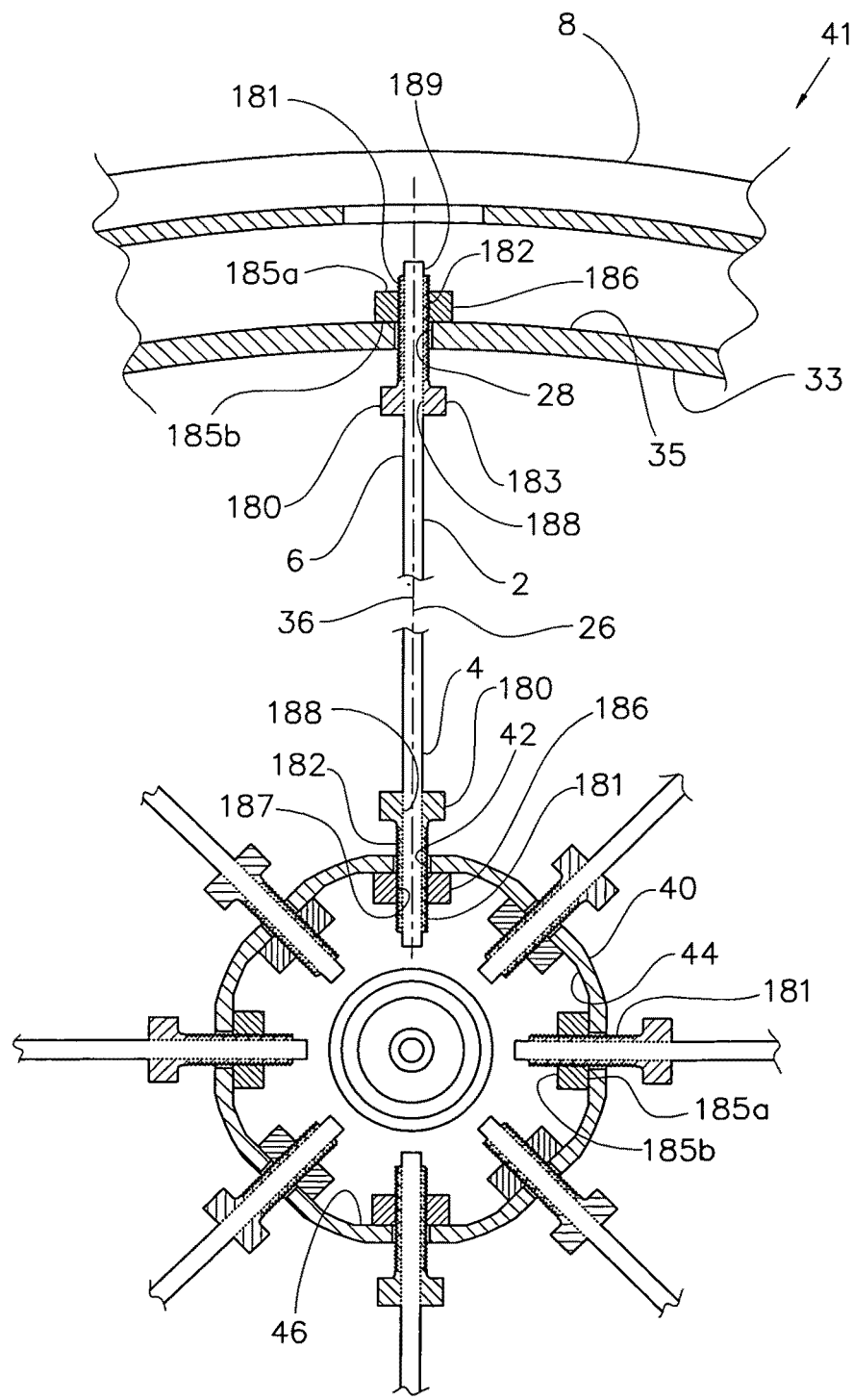
FIG. 4d is a partial cross sectional plan view of a wheel, illustrating the embodiment of FIG. 4a where the spoke is connected, by means of an overmolded connector at its first end, to a hub flange and, by means of an overmolded connector at its second end, to an outer rim.

FIG. 4d shows how a complete wheel 41 may be assembled by means of overmolded connectors 180. Rim 8 includes spoke bed wall 33 with outboard surface 35 and hole 28 therethrough. Threaded shank 182 is shown to be positioned to extend radially outwardly through hole 28 in the spoke bed wall 33, with the internal threads 187 of the nut 186 then threadably assembled to the external threads 181 of the threaded shank 182 such that the nut 186 provides an overlie connection with the spoke bed wall 33, with end face 185b bracing against the outboard surface 35 of the spoke bed wall 33. Connector 180 is engaged to nut 186 and nut 186 is engaged to spoke bed wall 33. Thus, nut 186 serves as an intermediate connecting element to connect the connector 180 to the bracing element. This threadable assembly may be threadably adjusted to selectively control the tension and/or position of the second end 6 of the spoke 2 relative to the rim 8. Such an adjustment may be achieved in a manner similar to that previously described in FIGS. 2a-b.

It should be noted that, the external threads 181 provide engagement geometry to engage the connector 180 to the bracing element and that the overmolded interface 188 longitudinally overlaps the external threads 181. This longitudinal overlapping may be preferable since it allows the spoke 2 to provide reinforcement to the connector 180 along the longitudinal axis in the high-stress area adjacent the external threads 181 and also allows the design to maximize the longitudinal overlap between the spoke 2 and the connector 180, thus maximizing the corresponding surface area of the overmolded interface 27.

Hub flange 40 includes axially extending flange ring 46 with inboard surface 44 and holes 42 therethrough. Connector 180 may be overmolded onto the first end 4 of the spoke 2, as previously described, such that threaded shank 182 may be positioned to extend radially inwardly through corresponding hole 42 in the flange ring 46, with the internal threads 187 of the nut 186 then threadably assembled to the external threads 181 of the threaded shank 182 such that the nut 186 provides an overlie connection with the hub flange 40 such that end face 185b is braced against the inboard surface 44 of the flange ring 46. This threadable assembly may be threadably adjusted to selectively control the tension and/or the position of the first end 4 of the spoke 2 relative to the hub flange 40. Connector 180 is engaged to nut 186 and nut 186 is engaged to flange ring 46. Thus, nut 186 serves as an intermediate or auxiliary connecting element to connect the connector 180 to the bracing element. Connector 180 may also be viewed as a connecting element to facilitate the connection of the spoke 2 with the bracing element.

Thus, it may be seen that the connector 180 is formed in a mold that defines its external surface. The internal surface of the connector 180 is simultaneously conformed to the spoke 2 at the overmolded interface 188. This external surface includes external threads 182 to provide mechanical engagement to connect the connector 180 to a bracing element (the outer rim 8 or the hub flange 40). The threaded engagement between the nut 186 and the connector 180 provides a means to adjust the effective length of the spoke 2 to provide a controlled tension or compression to the spoke 2. The spoke 2 is shown here to be a single-span spoke that terminates at the rim and at the hub.

Figure 4E:
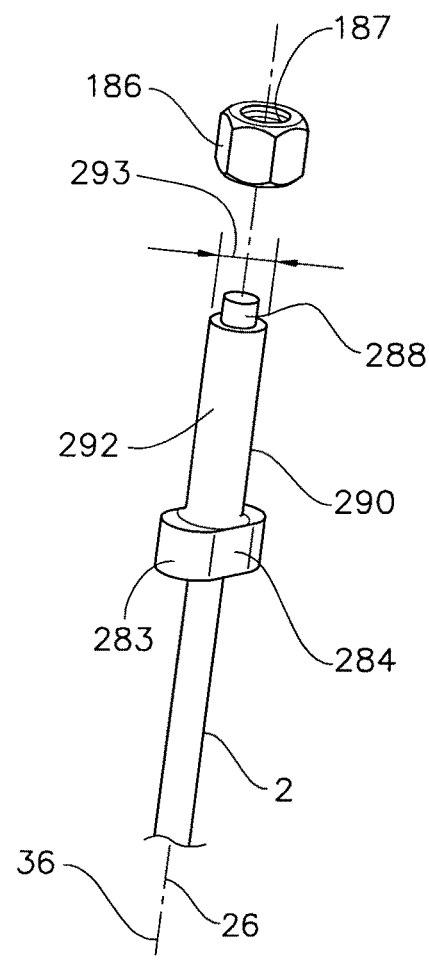
FIG. 4e is a partial perspective exploded view of a second embodiment of the present invention, showing a spoke with a non-threaded connector and a mating nut.

FIG. 4e describes an embodiment similar to FIGS. 4a-d, however the connector 290 does not initially include external threads. Instead, the shank 292 of the connector 290 is generally smooth. Connector 290 also includes enlarged portion 283 and flats 284 similar to the embodiment described in FIGS. 4a-d. Spoke 2 is exposed over much of its span length and extends through the connector 290 to include a second exposed portion 288. In this embodiment, nut 186, with internal threads 187, is intended to thread onto shank 292 in a "thread-forming" engagement that is known in industry, where the threads of the formerly unthreaded shank 292 are formed upon assembly with the nut 186. Thus the nut 186 is preferably of harder material than the shank 292 and the action of threadably engaging the internal threads 187 with the shank 292 serves to deform the shank 292 to create external threads in the previously smooth shank 292. To create an optimal thread-forming engagement, it is usually desirable that the diameter 293 of the shank 292 be sized at the approximate pitch diameter of internal threads 187. This embodiment is an example of an arrangement where an intermediate element (nut 186) is used to pinch and grip and engage the shank 292 of the connector 290, with the shank 292 oriented generally parallel to the tensile axis 36, to create an engagement to effectively anchor the spoke 2. Of course, such a gripping action may be achieved with a wide variety of arrangements well known in industry, including arrangements that clamp, grip, deform, or engage the connector. While FIG. 4e shows external threads being formed on a shank 292 by a "thread-forming" assembly, it is also envisioned that internal threads may alternatively be formed in a cavity (not shown) of the connector 290 by an externally threaded stud in a similar "thread-forming" assembly.

Figure 5A:
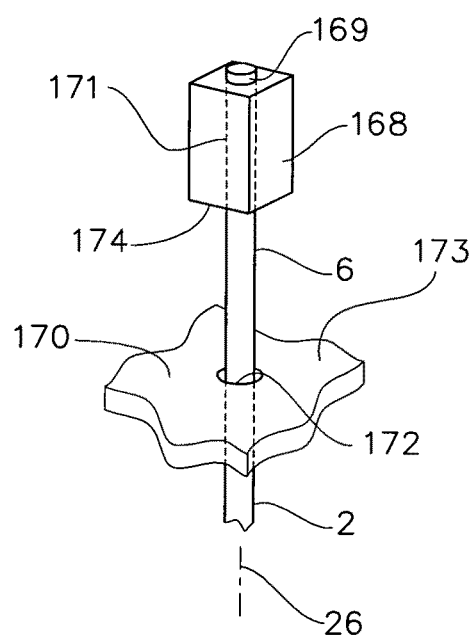
FIG. 5a is a partial perspective exploded view of a third embodiment of the present invention, showing the spoke with an overmolded connector, and showing the spoke passing through a hole in a bracing element.
Figure 5B:
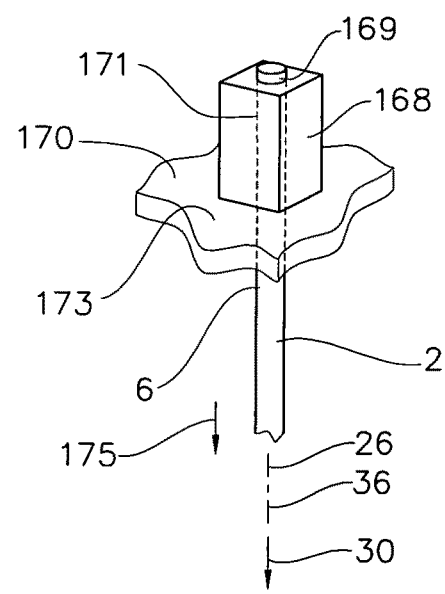
FIG. 5b is a cross sectional view of the embodiment of FIG. 5a, showing an overlie engagement between the overmolded connector and the bracing element.

FIGS. 5a-b describe one example of how a spoke, including an overmolded connector, may be anchored against a bracing element. Spoke 2 is joined to connector 168 at overmolded interface 171 and the connector includes downward facing bearing surface 174 for engagement with the bracing element 170. It may be viewed that connector 168 serves as an enlarged portion of the spoke 2 and bearing surface 174 serves as an engagement or transition surface. The second end 6 of the spoke 2 extends through the connector 168 to include an exposed portion 169, much like the exposed portion 18 of FIGS. 4a-d. There are several embodiments disclosed herein that describe means for connecting an anchoring element, such as connector 168, to the spoke 2, several of these means may be applied to the embodiments described herein. Bracing element 170 includes bracing face 173 and hole 172, through which the spoke 2 is extended to pass. The bracing element 170 is representative of the spoke bed of a rim or of a hub flange to which the spoke 2 is connected. With the application of spoke tension 30 along tensile axis 36, the spoke is drawn down so that bearing surface 174 overlies and bears against bearing face 173 in direction 175 as shown in FIG. 5b. Thus the spoke 2 is firmly anchored against the bracing element 170 via the connector 168. This embodiment is illustrative of how the connector 168 may directly engage the bracing element 170 to support and brace against spoke tension 30. Of course, any manner of intermediate elements may be utilized between the spoke 2 and the bracing element 170 to optimize the interface between these two components. For example, it may be desirable to incorporate a flat washer (not shown) between the bearing surface 174 and the bearing face 173 to distribute this interface stress due to spoke tension 30 loads over a broader surface area of the bracing element 170. This embodiment also shows a general arrangement where the connector 168 includes a bearing surface 174 that creates a projected area of overlie that is perpendicular to the tensile axis 36 to create an overlie engagement to effectively terminate the tensile element (spoke 2).

It should be noted that, the bearing surface 174 provides engagement geometry to engage the connector 168 to the bracing element 170. The edge of the bearing surface 174 is longitudinally adjacent the edge of the overmolded interface 171. Bearing surface 174 has similar function to transition surface 32 of FIGS 3*a-b*, however bearing surface 174 extends directly to the surface of the spoke 2, whereas transition surface 32 extends between two portions of the connector 24. Such an arrangement with bearing surface 174 may be preferable, since there is no shank (i.e. shank portion 29 of FIGS. 3*a-b*) required, which allows the surface area of bearing surface 174 to be maximized and extend to the spoke 2. Further, it should be noted that FIGS. 5*a-b* shows the overmolded interface 171 to be generally outboard of the bearing surface 174 along spoke span.

Figure 6A:
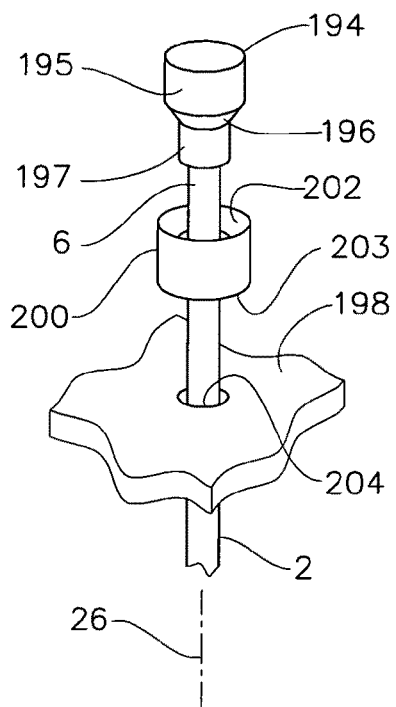
FIG. 6a is a partial perspective exploded view of a fourth embodiment of the present invention, showing the spoke with an overmolded connector, and showing the spoke passing through a hole in a bracing element and showing an intermediate ferrule.
Figure 6B:
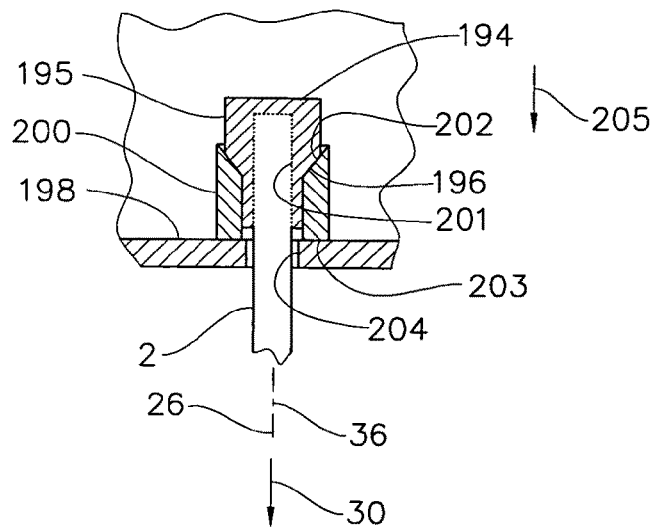
FIG. 6b is a cross sectional view of the embodiment of FIG. 6a, showing an overlie engagement between the overmolded connector and the intermediate ferrule and an overlie engagement between the intermediate ferrule and the bracing element.

FIGS. 6*a-b* describe an embodiment conceptually similar to the embodiment of FIGS. 5*a-b*, however an intermediate element is employed here to create the desired geometry to facilitate the connection between the connector and bracing element. As shown in FIG. 6*a*, connector 194 includes an enlarged portion 195, a shank 197, and a transition portion or flared shoulder 196, which serves as an engagement surface. While this connector 194 may be utilized to serve as an anchor point to directly connect with the bracing element 198 (such as a hub flange or rim), the connector 194 is preferably made from a relatively soft polymer resin and, if the geometry of the bracing element 198 is not well matched to the geometry of the connector 194, the contact surface between the two may be less than optimum with a reduced surface area, which results in higher contact stress such that the mating surfaces may distort slightly under applied spoke tension 30. Therefore, it may be preferable to incorporate a ferrule 200 that includes a bearing surface 202 to mate optimally with the flared shoulder 196 and an overlying surface 203 to mate and/or engage with the bracing element 198. As shown in FIG. 6*b*, the spoke 2 is joined to the connector 194 at a representative overmolded interface 201. The bearing surface 202 is well-matched to the surface of the flared shoulder 196 to distribute the contact stresses over a broader surface-to-surface area, rather than a surface-to-edge type of contact. The ferrule 200 is preferably made of a comparatively harder material, such as aluminum.

The spoke 2 extends through a hole 204 in the bracing element 198 as shown. As shown in FIG. 6*b*, spoke tension 30 is applied to the assembly, drawing the spoke 2 in direction 205 through the hole 204, forcing the shoulder 196 of connector 194 to bear against the bearing surface 202 of ferrule 200, and forcing the overlying surface 203 of ferrule 200 to bear against the bracing element 198. Thus, it may be seen that the ferrule 200 serves as an intermediate connecting element, structurally engaged between the connector 194 and the bracing element 198, to facilitate the connection between the spoke 2 and the bracing element 198. This is a representative embodiment where the intermediate connecting element or ferrule 200 has an overlie engagement with the bracing element 198. While the embodiment of FIGS. 6*a-b* shows a singular intermediate connecting element to facilitate an engagement between the overmolded connector 194 and the bracing element, it is also understood that a multiplicity of intermediate connecting elements, that may each be engaged to each other, may be substituted for the singular intermediate connecting element shown here. It should be noted that the overmolded interface 201 longitudinally overlaps the shoulder 196.

It should be noted that, in contrast to the embodiments of FIGS. 4*a-e* and 5*a-b*, where the spoke 2 extends through the connector 180 to include a second exposed portion 189, the embodiment of FIGS. 6*a-b* shows the connector 194 completely surrounding the second end 6 of the spoke 2, thus precluding the possibility of an exposed portion. Thus, during overmolding of connector 194 onto the spoke 2, where spoke 2 is an insert in an insert molding process, the spoke 2 may be supported on only one side of the mold cavity (not shown) that forms the connector 194. This leaves the second end 6 of the spoke 2 as cantilevered within the mold cavity during molding and, in comparison with the embodiments of FIGS. 4*a-d*, it may be easier for the spoke 2 to be deflected or distorted within the mold cavity due to the high-pressure flow of fluent molding material.

Figure 7A:
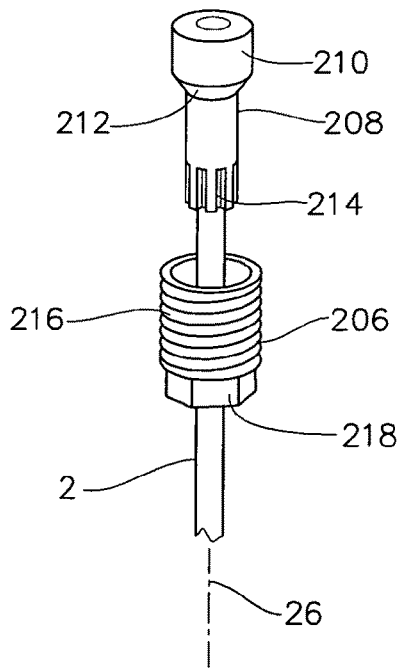
FIG. 7a is a partial perspective exploded view of a fifth embodiment of the present invention, showing the spoke with an overmolded connector, and showing the spoke passing through a hole in an intermediate threaded ferrule.
Figure 7B:
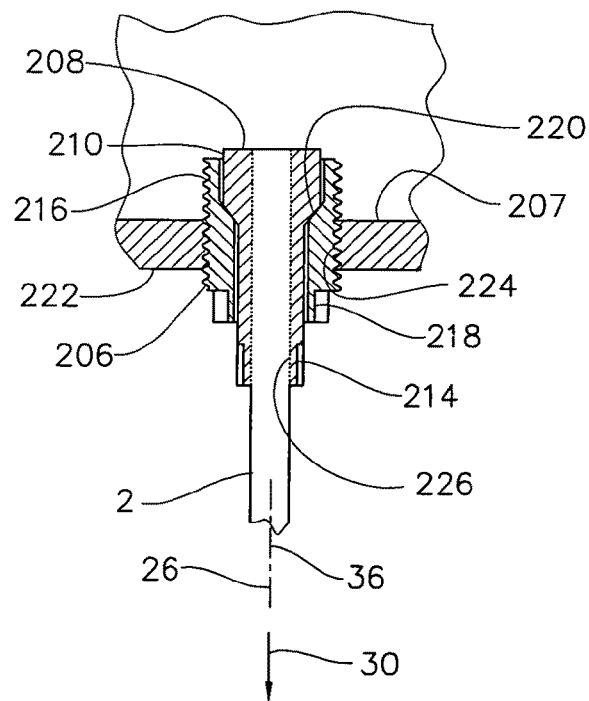
FIG. 7b is a cross sectional view of the embodiment of FIG. 7a, showing an overlie engagement between the overmolded connector and the intermediate threaded ferrule and a threaded engagement between the intermediate threaded ferrule and the bracing element.

FIGS. 7*a-b* describe an embodiment similar to FIGS. 6*a-b*, however, the ferrule 200 is replaced by threaded ferrule 206. Connector 208 includes an enlarged portion 210 with a flared shoulder 212. One end of the connector 208 includes splines 214 to mate with a wrench (not shown) for rotational manipulation of the connector 208. Threaded ferrule 206 includes external threads 216 and flats 218 to mate with a wrench (not shown) for rotational manipulation of the threaded connector 208. The inside diameter of the threaded ferrule 206 includes a bearing surface or step 220 to create a closely matched bearing surface to mate with the flared shoulder 212 of the connector 208. Connector 208 is joined to the spoke 2 by means of an overmolded interface 226. A bracing element, such as a rim 222 or hub flange (not shown), includes a threaded hole 224 in the spoke bed 207 wall. By utilizing separate wrenches on splines 214 and flats 218, the threaded ferrule 206 may be rotated independently from the connector 208 about the tensile axis 36. Threaded ferrule 206 may be rotated relative to rim 222 to adjust the effective length of the spoke 2, thus adjusting the spoke tension 30. Thus, it may be seen that the threaded ferrule 206 serves as an intermediate connecting member to facilitate the connection between the spoke 2 and the bracing element or rim 222. In contrast to the embodiment of FIGS. 6*a-b*, which shows an overlie engagement between the intermediate connecting element (ferrule 200) and the bracing element 198, the embodiment of FIGS. 7*a-b* employs a threaded engagement between the intermediate connecting element (threaded ferrule 206) and the bracing element (rim 222). It should be noted that the overmolded interface 226 longitudinally overlaps the flared shoulder 212.

The embodiment of FIGS. 8*a-b* is similar to FIGS. 4*a-d*, however the second end 6 of spoke 2 includes a configured surface 51, which consists of a region of variable cross section geometry that, in this case, includes a series of longitudinally spaced alternating raised surfaces and relieved surfaces projecting laterally from the sidewall of the spoke 2 as particularly illustrated in FIG. 8*a*. As shown in FIG. 8*b*, connector 50 includes an externally threaded shank 52 with external threads 54 and an enlarged portion 53 at one end. Externally threaded shank 52 may be mated with an internally threaded nut as described in FIGS. 4*a-d* to provide anchoring for the spoke 2 to resist spoke tension 30.

During overmolding, the molten molding material conforms to the configured surface 51 such that, upon subsequent solidification of the molding material, the connector 50 has a series of longitudinally spaced alternating raised surfaces and relieved surfaces that are nested and matched with the corresponding surfaces of the configured surface 51 at the overmolded interface 58. These nested and matched surfaces constitute a series of interlocking mechanical overlie engagements between the spoke 2 and the connector 50 to engage the connector 50 to the spoke 2 to resist spoke tension 30. The series of mechanical engagements are preferably arranged generally along the longitudinal axis 26 of the spoke 2 as shown to serve as a longitudinal engagement as previously described and to provide a more robust joinder between the connector 50 and the spoke 2. Further, this configured surface 51 also provides a greater external surface area than a corresponding smooth spoke, which corresponds to an overmolded interface 58 with greater surface area for a more robust joinder between the connector 50 and the spoke 2. Thus, the connector 50 is solidly anchored and integrally joined to the spoke 2 to resist spoke tension 30. It is understood that the configured surface 51 is also merely representative of a wide range of spoke cross section and surface geometries, both constant and variable along the longitudinal axis 26, that may be utilized to enhance the performance and design of the spoke/connector joinder. For example, the spoke 2 may be knurled, notched, threaded, flattened, fluted, necked, headed and/or tapered, among other geometries, in the region of the overmolded interface 58.

It is noted that a spoke 2 with a circular cross section provides the minimum amount of sidewall surface area for a given cross sectional area. Conversely, a flattened or other non-circular cross section provides greater sidewall surface area for the same given cross sectional area. Thus, a spoke 2 that is flattened or has a non-circular cross section will have a greater surface area at the overmolded interface 58 for a more robust joinder between the connector 50 and the spoke 2.

Figure 9A:
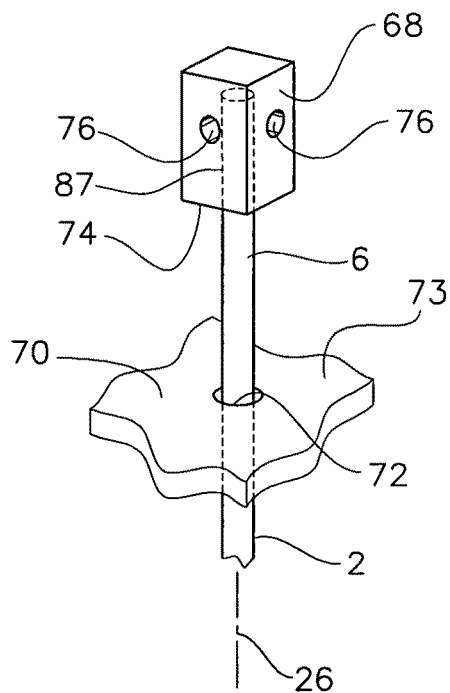
FIG. 9a is a partial perspective exploded view of a seventh embodiment of the present invention, showing the spoke with an overmolded connector, where the overmolded connector includes openings formed by alignment projections in the mold cavity.

FIGS. 9*a-d* describe an embodiment similar to the embodiment of FIGS. 5*a-b*. However, instead of the exposed portion 169, FIGS. 9*a-d* show the connector 68 as completely surrounding the second end 6 of the spoke 2. Further, as shown in FIG. 9*a*, connector 68 includes openings 76 that are formed in place when the connector 68 is molded. Connector 68 includes bearing surface 74 and is also shown to be generally rectangular or otherwise having non-circular external geometry, which may be utilized to rotate, fix or manipulate the connector with a wrench or other means. Bracing element 70 includes bracing face 73 and hole 72, through which the spoke 2 is extended to pass. The bracing element 70 is representative of the spoke bed of a rim or of a hub flange to which the spoke 2 is connected. It should be noted that the overmolded interface 87 is shown to be generally outboard of the bearing surface 74.

FIGS. 9*b-d* describe the molding process involved in molding the connector 68 as shown in FIG. 9*a*. FIG. 9*b* shows how the connector of FIG. 9*a* may be molded in a mold comprised of mold halves 78*a* and 78*b*, each including cavity portions 82*a* and 82*b* respectively to create mold cavity 84, and a parting line 75 at the interface where mold halves 78*a* and 78*b* meet. It may be seen that the spoke 2 is a preformed element that extends through the parting line 75 as a molding insert and that the cavity portions 82*a* and 82*b* permit the overmolded connector 68 to surround the cross section of the spoke in a process commonly referred to as "insert molding". Mold halves 78*a* and 78*b* also include projections or core pins 80 that extend through their respective cavity portions 82*a* and 82*b* to contact or come close to the spoke 2 as shown. Mold half 78*a* includes a sprue opening 85 that extends to the cavity 84. Mold halves 78*a* and 78*b* are clamped together in directions 86*a* and 86*b*, forcing the mold halves to seal against each other at the parting line.

Next, as shown in FIG. 9*c*, molten molding material, such as polymeric resin, is introduced to the mold cavity 84 through the sprue opening 85. It may be understood that, as the cavity is being filled with molten molding material, the pressure of flowing molding material may be uneven within the cavity 84. This uneven pressure may induce the spoke insert to flex or deflect somewhat. However, as shown in these figures, the ends of the core pins serve to support and gird spoke 2 against appreciable deflection and to maintain the alignment of the spoke during the molding process. The mold cavity 84 is then completely filled with molten material such that the molten material is conformed to the surfaces of the mold cavity 84 and to the spoke 2 insert and is also flowed to surround and conform to the core pins 80. Sprue opening 85 is now also filled as well. The molten molding material in the cavity 84 is then allowed to solidify, either by cooling or by curing or by some other means to create a solidified connector 68 that includes the spoke 2. Note that representative sprue 89 is also solidified in sprue opening 85.

Next, as shown in FIG. 9*d*, the mold halves 78*a* and 78*b* are separated in directions 88*a* and 88*b* respectively. The connector 68 is separated from the sprue 89 and the overmolded connector 68 and spoke assembly may now be removed from the mold halves 78*a* and 78*b*. It may be seen that openings 76 remain in the connector 68, which had been formed by core pins 80. Thus, it may be seen that the connector 68 is made of hardened molding material and that the spoke 2 is simultaneously overmolded by the connector 68 during solidification of the hardened molding material. The connector 68 is now joined to the spoke 2 at the overmolded interface 87 as previously discussed and this assembly may now be put into service as previously described. The connector 68 may be formed by means of many molding processes known in industry, including plastic injection molding. Note that this is a representation of a generic molding process well known in industry. It is also understood that the mold halves 78*a* and 78*b* are merely representative to illustrate a generic molding process, including a mold cavity and a parting line. Other requisite mold details and alternate arrangements are known in industry and may not be shown here.

Figure 10:
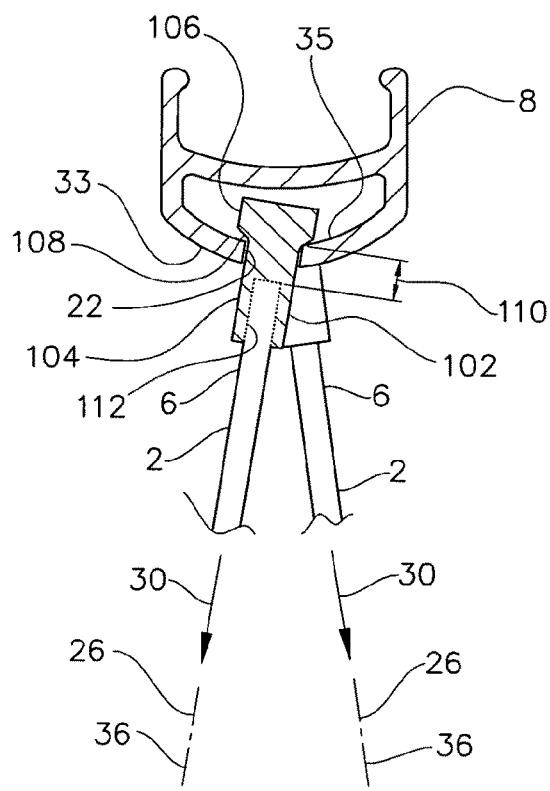
FIG. 10 is a cross sectional view of an eighth embodiment of the present invention, showing an overmolded interface inboard of the spoke span.

FIG. 10 describes an embodiment similar to FIGS. 3*a-b*, however while FIGS. 3*a-b* show the spoke 2 as extending longitudinally through the connector 24, FIG. 10 shows the spoke 2 as extending longitudinally only within the shank portion 104 of the connector 102. The rim 8 shown here is identical to that shown in FIGS. 3*a-b* and includes a multiplicity of spoke holes 22 in its spoke bed wall 33, each to accept an individual connector 102. It is noted that the rim 8 shown here is an exemplary representation of a bracing element that may serve as a rim or a hub flange and may take on a wide range of forms.

The connector 102 is shown to be overmolded relative to the second end 6 of the spoke 2 to create an overmolded interface 112 as previously described. The connector 102 includes a shank portion 104, a head portion 106, and a transition surface 108 therebetween, with the transition surface serving as an engagement surface. Shank portion 104 extends through spoke hole 22, with transition surface 108 bearing against the radially outboard surface 35 of the spoke bed wall 33 in an overlie engagement, which provides blocking engagement to resist spoke tension 30. It should be noted that, the transition surface 108 provides engagement geometry to engage the connector 102 to the bracing element (rim 8). In contrast to FIGS. 3*a-b*, the overmolded interface 112 extends longitudinally to a point that is located inboard of the transition surface 108 along the spoke span by distance 110. Thus FIG. 10 is exemplary of an embodiment where the entire overmolded interface is inboard of the engagement surface.

Figure 11:
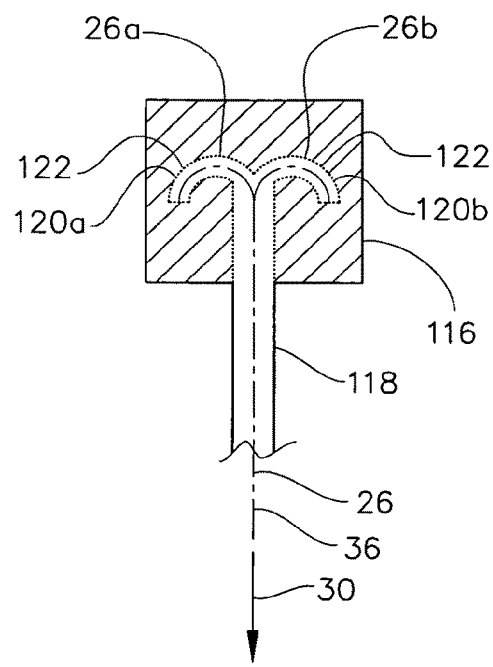
FIG. 11 is a cross sectional view of an ninth embodiment of the present invention, showing the spoke as split into two portions within the overmolded connector.

FIG. 11 shows an embodiment similar to several of the above embodiments, however this embodiment shows the spoke 118 as forked and split into two extension portions 120a and 120b, with these two extension portions 120a and 120b bent so their respective longitudinal axis 26a and 26b are diverted from being collinear to the tensile axis 36. The spoke 118 and extension portions 120a and 120b are overmolded by the connector 116, as shown, to create overmolded interface 122. This embodiment also provides a representative example of the myriad of ways that the spoke may be formed to provide an optimized connection between the connector 116 and the spoke 118 to support spoke tension 30.

Figure 12:
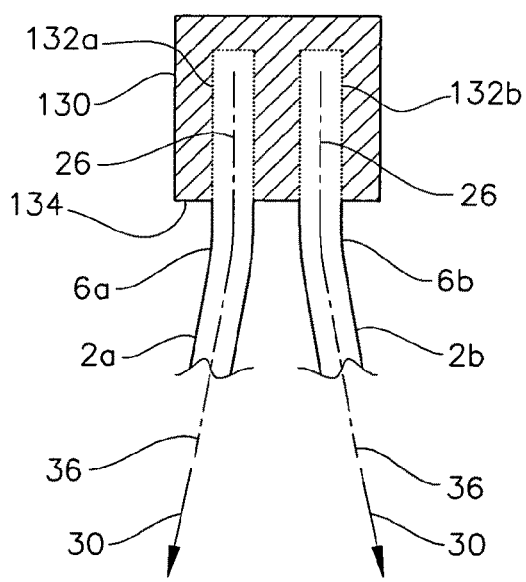
FIG. 12 is a cross sectional view of an tenth embodiment of the present invention, showing a multiplicity of spokes joined to a single overmolded connector.

FIG. 12 shows an embodiment similar to several of the above embodiments, however this embodiment is representative of an arrangement where a multiplicity of spokes are overmolded by a single connector. The spokes 2a and 2b include second ends 6a and 6b respectively, which are both overmolded by connector 130 and are joined thereto at corresponding overmolded interfaces 132a and 132b. Connector 130 also includes bearing surface 134 for engagement with a bracing element (not shown) to support spoke tension 30.

Figure 13:
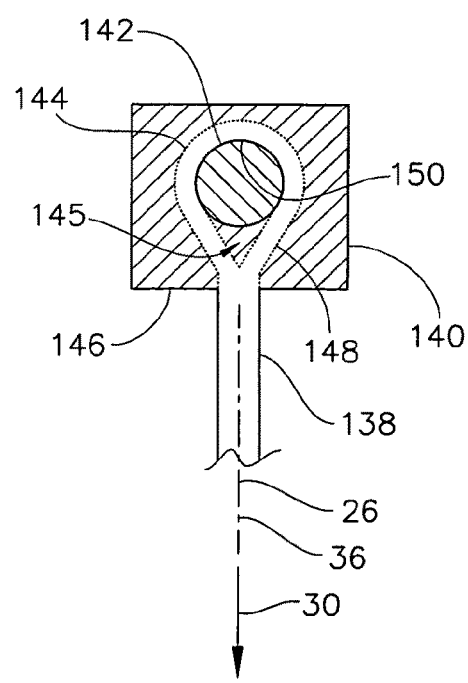
FIG. 13 is a cross sectional view of an eleventh embodiment of the present invention, including a spoke with an opening and an intermediate component between the spoke and the overmolded connector.

FIG. 13 shows an embodiment similar to several of the above embodiments, however this embodiment is representative of an arrangement where the spoke 138 engages an intermediate component, such as cross pin 142 within the connector 140. Spoke 138 includes a loop portion 144 with opening 145 therein. Connector 140 includes hole 150 and bearing surface 146 to engage a bracing element (not shown) as previously described. Cross pin 142 extends through hole 150 and opening 145 to engage the spoke 138 as shown. Further, overmolded connector 140 is engaged to the cross pin 142 and is also joined to the spoke 138 and loop portion 144 at overmolded interface 148. Thus, the engagement between the loop portion 144 and the cross pin 142 provides further engagement, in addition to the overmolded interface 148, to support spoke tension 30. The cross pin 142 may be incorporated in the assembly as a second pre-formed molding insert (in addition to the spoke 138 insert) during molding of the overmolded connector 140. Alternatively, the connector 140 may include a pre-formed hole 150 that is drilled, molded in place, or otherwise formed. The cross pin 142 may then be inserted in the hole 150 such that it engages both the loop portion 144 and the connector 140 to provide a mechanical engagement link between the loop portion 144 and the connector 140 to resist spoke tension 30. This embodiment is a representative arrangement to illustrate how an auxiliary component may be incorporated in the overmolded connection between the spoke 138 and the connector 140. Further, if the cross pin 142 were not included, the material from the overmolded connector 140 may flow within opening 145 so that, upon the subsequent solidification of the connector 140, the connector would have mechanical engagement and blocking between the connector 140 and the opening 145.

While my above description contains many specificities, these should not be construed as limitations on the scope of the invention, but rather as exemplifications of embodiments thereof.

While the connector of the present invention may be directly connected to the bracing element (such as the rim or the hub), there are many cases where it is desirable to include one or more intermediate components to facilitate this connection. For example, the connector may engage the intermediate component and the intermediate component may engage the bracing element.

The embodiments shown here show the spokes being held in tension, in the construction of tension-spoke wheels. It is understood that these embodiments may alternatively be configured to be held in compression, in construction of compression-spoke wheels.

While several of the embodiments shown describe a single continuous overmolded interface to anchor a single spoke, it is also envisioned that a multiplicity of overmolded interfaces may be utilized to anchor a single spoke. For example, a multiplicity of connecting elements may be overmolded to a single spoke, each having its own corresponding overmolded interface. Alternatively, a single spoke may be overmolded by a single connecting element at a multiplicity of discreet overmolded interfaces, resulting in a multiplicity of overmolded interfaces.

While the above description is particularly focused on bicycle or vehicle wheel spokes as tensile elements, and this is the preferred embodiment of the present invention, however it is envisioned that the present invention may be adapted to applications involving a wide range of tensile element applications outside of vehicle wheel applications. Some example applications may include control cables, guy wires, fiber optic cables, overhead high-tension lines, architectural and infrastructure cabling, pre-stressed rebar, etc.

While the embodiments illustrated herein are focused on the utilization of injection molding techniques to create overmolded interfaces to join the connecting elements with spokes made with thermoplastic polymer materials, these are merely representative molding techniques and surface materials. The present invention may be readily applied to a wide range of alternate molding and casting techniques as described hereinabove. Further, the present invention may be applied to connecting elements of any moldable or castable material, including metals.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

Thus, the present invention provides a vehicle wheel that is inexpensive to produce, lends itself easily to high-volume manufacturing methods, is light in weight and is strong and reliable. Further, the present invention allows the connector to include geometry to optimize its engagement with the bracing element and/or an intermediate element. Further still, the present invention reduces wheel weight by facilitating the utilization of light weight materials, by allowing greater freedom in geometry to optimize the design, by facilitating the use of fiber reinforced spokes. Yet further, the present invention increases the strength and reliability of the wheel by reducing stresses in components and connections, by eliminating any clearances or relative movement between the hub and spokes, and by eliminating any unsupported bends in the spokes.

What is claimed is:
1. A tensile connector assembly comprising:
a longitudinal tensile element having an end portion, a span portion, and a cross-section thereof;
a connecting element;
a bracing element;
a tensile axis of applied tensile load along the span portion of said longitudinal tensile element;

a longitudinal axis along said longitudinal tensile element;
wherein said span portion extends between two of said bracing elements;
wherein said connecting element is made of hardened molding material;
wherein said longitudinal tensile element is overmolded by said connecting element during solidification of said hardened molding material;
wherein said connecting element is joined to said longitudinal tensile element at an overmolded interface;
wherein said connecting element is connected to said bracing element; and
wherein said longitudinal tensile element is at least a portion of a vehicle wheel spoke connected to a vehicle wheel and wherein said spoke has a first end connected to a hub of said vehicle wheel and a second end connected to an outer rim of said vehicle wheel and wherein said bracing element is one of said rim and said hub.

2. A tensile connector assembly according to claim 1, wherein said longitudinal tensile element supports tensile load in tension.

3. A tensile connector assembly according to claim 1, wherein said longitudinal tensile element supports tensile load in compression.

4. A tensile connector assembly according to claim 1, wherein said longitudinal tensile element is a pre-formed element.

5. A tensile connector assembly according to claim 1, wherein said longitudinal tensile element is integrally joined to said connecting element.

6. A tensile connector assembly according to claim 1, wherein a portion of said longitudinal tensile element is exposed and external to said connecting element.

7. A tensile connector assembly according to claim 6, wherein said longitudinal tensile element extends through said connecting element to include two exposed portions on opposed sides of said connecting element.

8. A tensile connector assembly according to claim 1, wherein said connecting element includes non-circular external geometry to facilitate the manipulation of said connecting element about said longitudinal axis.

9. A tensile connector assembly according to claim 8, wherein said non-circular external geometry may be manipulated by a wrench.

10. A tensile connector assembly according to claim 1, wherein said connecting element includes reinforcement fibers in a matrix.

11. A tensile connector assembly according to claim 10, wherein at least a portion of said reinforcement fibers are at least 4 millimeters in length.

12. A tensile connector assembly according to claim 1, wherein said connecting element includes an engagement surface and wherein said connecting element is engaged to said bracing element at said engagement surface.

13. A tensile connector assembly according to claim 12, wherein said engagement surface of said connecting element is formed upon assembly with one of said bracing element and an intermediate element connected to said bracing element.

14. A tensile connector assembly according to claim 13, wherein said connecting element is formed upon assembly in a thread-forming engagement.

15. A tensile connector assembly according to claim 12, wherein said engagement surface of said connecting element is formed in a mold upon said solidification of said hardened molding material.

16. A tensile connector assembly according to claim 12, including a direct overlie engagement between said connecting element and said bracing element.

17. A tensile connector assembly according to claim 12, including an intermediate element and including an overlie engagement between said connecting element and said intermediate element and wherein said intermediate element is engaged to said bracing element.

18. A tensile connector assembly according to claim 17, wherein said overlie engagement between said connecting element and said intermediate element includes matched surface-to-surface bearing contact between a surface of said intermediate element and a surface of said connecting element.

19. A tensile connector assembly according to claim 17, wherein said overlie engagement between said connecting element and said intermediate element includes helical threads.

20. A tensile connector assembly according to claim 17, wherein said intermediate element is engaged to said bracing element by means of an overlie engagement.

21. A tensile connector assembly according to claim 17, wherein said intermediate element is engaged to said bracing element by means of a threaded engagement.

22. A tensile connector assembly according to claim 1, including a pre-formed auxiliary element, wherein both said longitudinal tensile element and said connecting element are engaged to said auxiliary element.

23. A tensile connector assembly according to claim 22, including an overlie engagement between a surface of said auxiliary element and a surface of said connecting element, wherein said overlie engagement provides blocking to resist said tensile load.

24. A tensile connector assembly according to claim 12, wherein said overmolded interface overlaps said engagement surface generally along said longitudinal axis.

25. A tensile connector assembly according to claim 12, wherein said overmolded interface is located substantially outboard of said engagement surface and beyond said span portion.

26. A tensile connector assembly according to claim 12, wherein said overmolded interface is located substantially inboard of said engagement surface and within said span portion.

27. A tensile connector assembly according to claim 12, wherein said connecting element includes a bearing surface at the transition between an external surface of said connecting element and an external surface of said longitudinal tensile element and wherein said bearing surface constitutes said engagement surface.

28. A tensile connector assembly according to claim 12, wherein said connecting element includes a transition surface at the transition between two portions of said connecting element, wherein said transition surface constitutes said engagement surface.

29. A tensile connector assembly according to claim 12, wherein said connecting element include a helical thread, wherein said helical thread constitutes said engagement surface.

30. A tensile connector assembly according to claim 1, wherein said overmolded interface includes a welded or otherwise fused surface interface between said connecting element and said longitudinal tensile element at said overmolded interface.

31. A tensile connector assembly according to claim 1, wherein said overmolded interface includes an adhered or otherwise chemically coupled surface interface between said connecting element and said longitudinal tensile element at said overmolded interface.

32. A tensile connector assembly according to claim 1, wherein said overmolded interface includes a gripped or frictionally connected surface interface between said connector and said longitudinal tensile element at said overmolded interface.

33. A tensile connector assembly according to claim 1, wherein said overmolded interface includes a mechanical interlock engagement interface between said connector and said longitudinal tensile element at said overmolded interface.

34. A tensile connector assembly according to claim 33, wherein said mechanical interlock engagement includes a configured surface of said longitudinal tensile element that is matched and nested with mating surface geometry of said connecting element.

35. A tensile connector assembly according to claim 34, wherein said configured surface includes variable cross-sectional geometry.

36. A tensile connector assembly according to claim 1, wherein said longitudinal tensile element includes non-circular cross-section geometry for increased surface area at said overmolded interface.

37. A tensile connector assembly according to claim 1, wherein said longitudinal tensile element is forked or otherwise split in the region of said overmolded interface.

38. A tensile connector assembly according to claim 1, wherein said longitudinal tensile element includes a loop portion in the region of said overmolded interface.

39. A tensile connector assembly according to claim 1, wherein said longitudinal tensile element includes a straight end portion in the region of said overmolded interface.

40. A tensile connector assembly according to claim 1, wherein said longitudinal tensile element includes high strength fibers.

41. A tensile connector assembly according to claim 40, wherein said high strength fibers are aligned to be generally parallel to said longitudinal axis.

42. A tensile connector assembly according to claim 40, wherein said high strength fibers are continuous fibers.

43. A tensile connector assembly according to claim 40, wherein said high strength fibers of said longitudinal tensile element extend along said longitudinal axis within said overmolded interface.

44. A tensile connector assembly according to claim 40, wherein said high strength fibers are encapsulated in a matrix.

45. A tensile connector assembly according to claim 44, wherein said matrix is at least one of a thermoplastic polymer resin and a thermoset polymer resin matrix.

46. A tensile connector assembly according to claim 1, wherein at least a portion of the external surface of said connecting element is formed in a mold.

47. A tensile connector assembly according to claim 46, wherein said longitudinal tensile element constitutes a molding insert in said mold during the forming of said connecting element.

48. A tensile connector assembly according to claim 46, wherein said hardened molding material is formed by means of a high pressure molding process, selected from the series of injection molding and die casting.

49. A tensile connector assembly according to claim 1, wherein at least a portion of said connecting element is formed in a mold to include said spoke.

50. A tensile connector assembly according to claim 34, wherein said interlock engagement is a longitudinal engagement.

* * * * *